United States Patent [19]

Mills

[11] Patent Number: 5,135,035
[45] Date of Patent: Aug. 4, 1992

[54] INDEPENDENTLY ROTATABLY CUTTING BIT FOR ROTARY WHEEL CUTTERS

[76] Inventor: Ronald D. Mills, 960 S. Jay Cir., Anaheim, Calif. 92807

[21] Appl. No.: 663,578

[22] Filed: Mar. 1, 1991

[51] Int. Cl.⁵ .............................................. B23G 13/00
[52] U.S. Cl. .................................. 144/241; 144/2 N; 407/46; 299/91
[58] Field of Search ...................... 407/7, 46, 113, 115, 407/118; 144/2 N, 218, 241, 237; 299/91, 92; 37/142 R

[56] References Cited

U.S. PATENT DOCUMENTS

| | | | |
|---|---|---|---|
| 4,136,594 | 1/1979 | Tyler | 144/241 |
| 4,302,055 | 11/1981 | Persson | 407/46 |
| 4,337,980 | 7/1982 | Krekeler | 407/46 |
| 4,343,516 | 8/1982 | Aden | 407/46 |
| 4,462,638 | 7/1984 | DenBesten | 409/7 |
| 4,506,715 | 3/1985 | Blackwell | 144/241 |
| 4,738,291 | 4/1988 | Isley | 144/241 |
| 4,998,574 | 3/1991 | Beach et al. | 144/241 |

Primary Examiner—W. Donald Bray
Attorney, Agent, or Firm—William L. Chapin

[57] ABSTRACT

An improved cutting bit and associated holding block assembly for use on rotary wheel, chain or rotor cutters of the type having a plurality of cutting bits projecting outwards from the periphery of the wheel, chain or rotor and used to cut tree stumps or other hard or refractory materials includes individual holding blocks which each rotatably support within a bore therewithin a separate cylindrical cutting bit. The bore is canted inwards with respect to a radius of the wheel, chain or rotor, thus causing the outermost portion of a rotatable bit held in the bore to contact a surface to be worked at a negative top rake angle as the bit is rotated into contact with the work surface. The negative top rake angle advantageously provides clearance for chips severed by the bit. However, the dihedral angle between the outer transverse wall surface of the circular cutting bit tip and its outer tapered side wall is sufficiently acute as to present an effectively sharp angle between the cutting edge of the tip and the surface being worked.

22 Claims, 2 Drawing Sheets

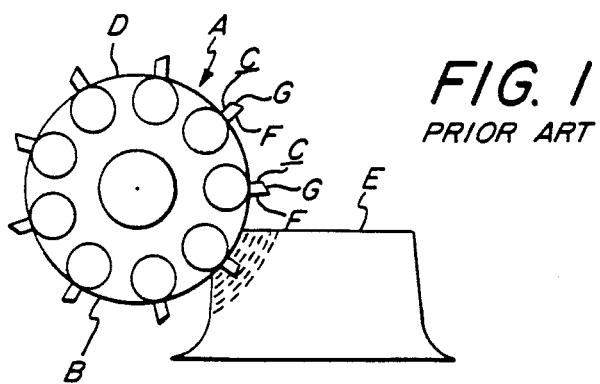
FIG. 1
PRIOR ART
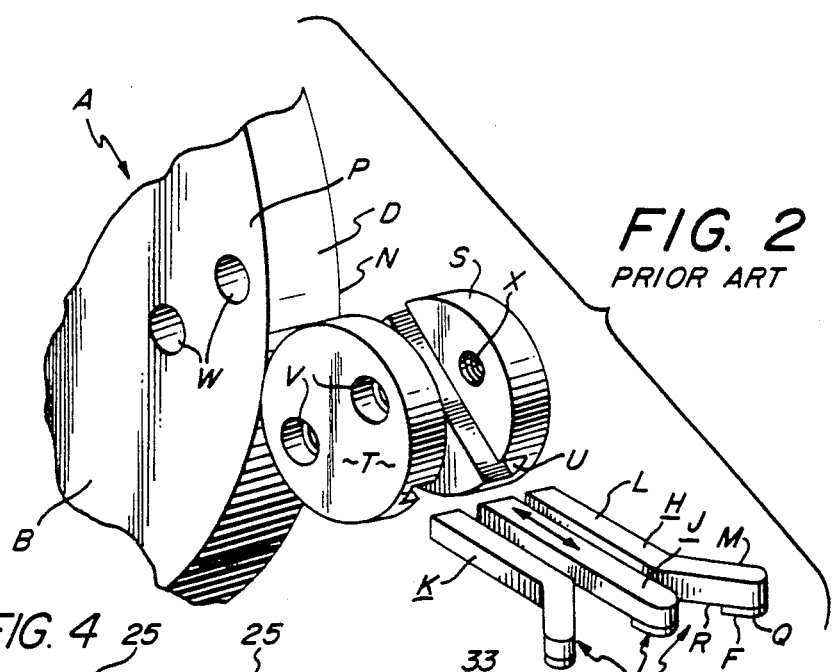
FIG. 2
PRIOR ART
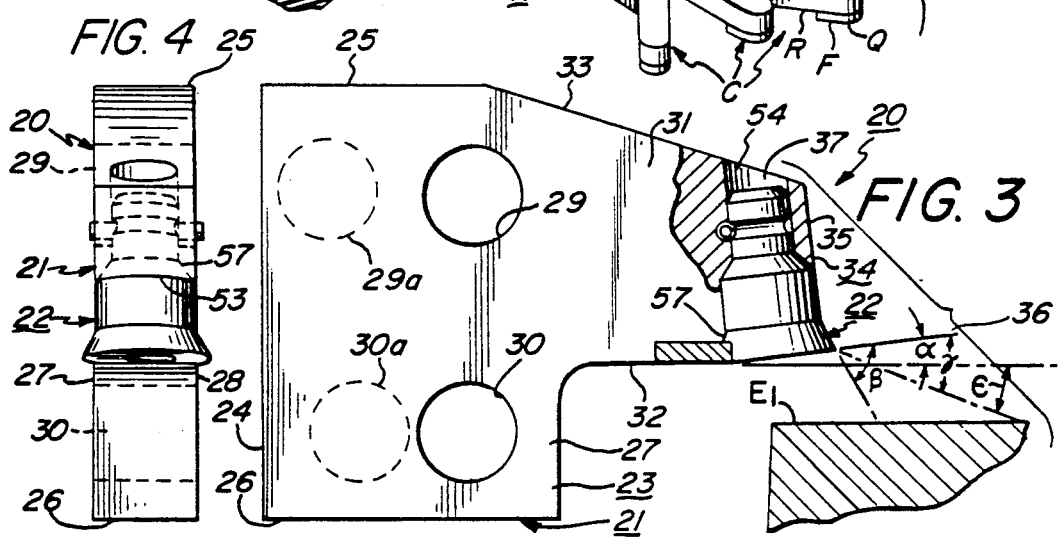
FIG. 4
FIG. 3

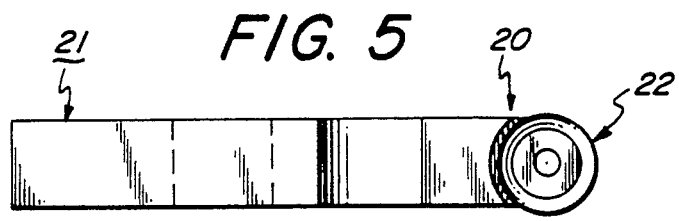
FIG. 5
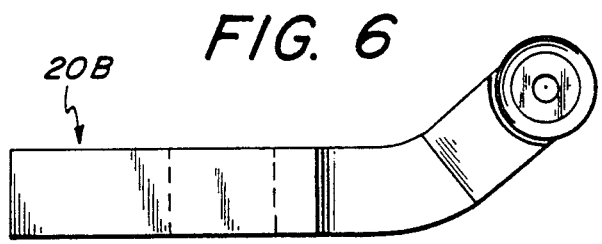
FIG. 6
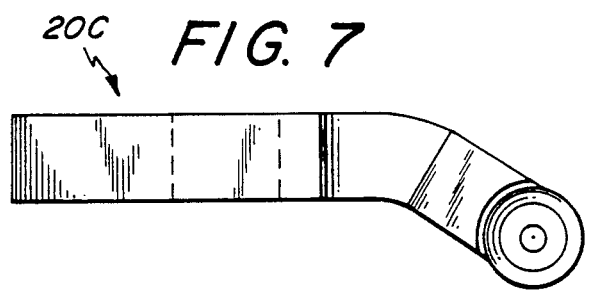
FIG. 7
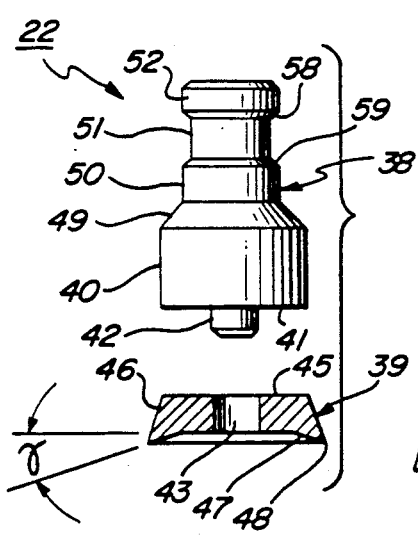
FIG. 8
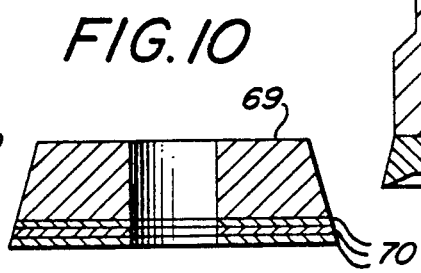
FIG. 9
FIG. 10

INDEPENDENTLY ROTATABLY CUTTING BIT FOR ROTARY WHEEL CUTTERS

FIELD OF THE INVENTION

The present invention relates to implements for cutting rugged objects such as tree stumps, and concrete or asphalt road surfaces. More particularly, the invention relates to an improved cutting bit and holding block assembly for use on rotary wheel cutters of the type employing a plurality of radially outwardly projecting cutting bits disposed about the periphery of a wheel or rotor.

BACKGROUND OF THE INVENTION

Machines used to cut or pulverize large hard objects such as concrete walls, trenches, tunnels or roadways relatively large, powerful and rugged. Many such machines employ a relatively large and rugged rotating wheel, rotor or endless chain which has a plurality of cutting bits projecting radially outwards from the periphery of the wheel. The bodies of cutting bits used in the machines to work on refractory materials are usually made of strong steel. Working surfaces of the cutting bits are generally made of an even harder material such as tungsten carbide. However, even cutting bits which are ruggedly made, as described above, are worn out or broken at a relatively rapid rate, when used to cut or grind road surfaces, concrete walls, trenches, tunnels and the like. For that reason, most rotary wheel cutters used for such applications are provided with cutting bits which may be individually replaced when worn out or broken.

Rotary wheel cutters of a particular type are also used to cut tree stumps. Typical rotary wheel stump cutters use a vertically disposed rotary wheel having a plurality of carbide tipped cutting bits which are positioned at regular circumferential intervals around the periphery of the wheel and project radially outwards from the wheel. The wheel is driven at approximately 900 rpm. by a 65 horsepower motor, and is moved horizontally into contact with a stump. The rotation axis of the wheel is then pivoted or swung back and forth in a horizontal plane. As the wheel cuts an arc-shaped swath into the stump, the machine is advanced forward and downwards into the stump, until the entire stump is cut down.

Rotary wheel stump cutters of the type described above are typified by the apparatus described in the following patents:

McCreery, U.S. Pat. No. 3,570,566, Mar. 16, 1971. Rotary Cutting Device: Discloses a stump cutter having a vertically oriented rotating disc mounted on the outer end of a swingable arm. The disc has a plurality of support blocks for cutting bits mounted about its periphery. Each support block has a bore which rotatably supports a picklike cutting bit.

Ver Ploeg, U.S. Pat. No. 3,797,544, Mar. 19, 1974. Cutter Disc: Discloses a cutter disc for stump cutting machines which has a plurality of cutter tools on opposite sides thereof and each of the tools includes a bit holder having half sections for clamping the shank of a bit therebetween in a slot formed in the mating face of one of the half sections. The mating faces of the half sections are in a plane extending at an angle to the disc such that the bit extends at an angle to the disc and radially outwardly from the disc center axis of rotation. The bit holder may be turned between two positions 180 degrees apart and the bit will extend outwardly relative to the disc in one position and inwardly relative to the disc in the other position. A pair of bolts extend through the holder half sections and the disc to connect two holders on the disc on opposite sides thereof. The depth of the slot perpendicular to the face thereof is less than the thickness of the bit shank to assure clamping action by the two half sections when drawn tightly together. The bits include a cutting head having a depth limiting shoulder such that all bits extend uniformly into the bit holders at equal distance and are limited by the shoulders engaging the outer edge of the holder.

Ver Zante & Ver Ploeg, U.S. Pat. No. 3,935,887, Feb.3, 1976 Cutter Disc: Discloses a stump cutter disc similar to the above-cited disc, but having square rather than circular plan view bit holding block half sections which are stated to require less specialized tooling for their fabrication.

British Patent 1,139,679, Powell. Jan. 8, 1969. Improvements In And Relating To Apparatus For Clearing Tree Stumps And Roots: Discloses an improvement for rotary disc stump cutters comprising a hydraulically actuated articulating arm support structure for the disc.

Some rotary wheel stump cutters of the type listed above use opposed pairs of carbide tipped cutting bits of different shapes at different circumferential locations around the periphery of a rotating, vertically disposed wheel. The cutting bits are removably attached to regularly spaced circumferential stations around the periphery of the wheel. Outward radial projection of the carbide-tipped bits from the circumference of the wheel is adjustable, and the shape and radial projection of each cutting bit is selected according to a pre-determined pattern which has been found to optimize the stump cutting operation.

In normal operation of rotary wheel stump cutters, the cutting bits are subjected to very large impact and abrading forces For that reason, cutting bits wear out rapidly, and must frequently be replaced. Replacement of cutting bits is a time consuming process, in part because the radial projection of each bit must be individually adjusted to a specified value before the bit is fastened tightly to the wheel. Also, cutting bits used in prior art stump cutters have both a positive side cutting angle and a positive top rake angle. A positive top rake angle on bits used for stump cutting is disadvantageous because chips severed from the stump tend to jam between the body of the tip and the surface of the stump being cut.

A number of prior art cutting tools, used in various applications unrelated to stump cutting, disclose cutting bits having a peripheral cutting edge formed between two surfaces intersecting at an acute angle, thereby permitting presentation of a positive rake angle with respect to a surface being cut, while being mounted in a holder having a negative rake angle. This arrangement provides clearance between the cutting bit edge and a work surface being cut. Several of the patents listed below disclose such cutting tools.

Jones, et al., U.S. Pat. No. 3,399,442, Sep. 3, 1968, Cutting Insert.

Weller, et al., U.S. Pat. No. 3,341,921, Sep. 19, 1967. Cutting Insert.

Keller U.S. Pat. No. 3,341,923. Sep. 19, 1967. Cutting Tool.

Jones, U.S. Pat. No. 3,557,416, Jan. 26, 1971, Cutting Insert.

Porat, et al., 4,367,990, Jan. 11, 1983, Cutting Insert.

Allaire, et al., U.S. Pat. No. 4,618,296. Oct. 21, 1986. Cutting Tool And Insert Therefore.

Briese, U.S. Pat. No. 4,621,955, Nov. 11, 1986, Cone Shaped Cutting Insert.

Briese, U.S. Pat. No. 4,482,916, Jul. 28, 1987. Cutting Insert Arrangement.

Shimomura, et al., U.S. Pat. No. 4,699,549, Oct. 13, 1987, Insert Rotary Cutter.

British Patent 607,770, Fear, Sep. 6, 1948, Improvements In Or Relating To Cutting Tools For Lathes And Other Machine Tools.

British Patent 2,057,939. Apr. 8, 1981. Cuming. Method Of Machining And A Rotary Cutting Tool Therefor.

British Patent 2,092,032, Aug. 11, 1982, McCreery Cutting Insert.

The present inventor is unaware of any prior art rotary wheel cutter in which positive rake angle bits are supported in negative rake angle holders. Thus, in view of the limitations of prior art rotary wheel cutters described above, the present invention was conceived of.

OBJECTS OF THE INVENTION

An object of the present invention is to provide an improved cutting bit and holding block assembly for rotary wheel, rotor, and chain-type cutters.

Another object of the present invention is to provide a cutting bit and holding block assembly in which the cutting bit is maintained at a negative top rake angle, while maintaining the cutting surface at a positive cutting angle.

Another object of the invention is to provide a cutting bit holding block assembly for rotary wheel, chain and supported, allowing the bit to rotate around its longitudinal axis and thereby present a rotatably changing cutting edge to a surface being cut.

Another object of the invention is to provide a cutting bit and holding block assembly in which the bit is securely held rotatably within the holding block even with the cutting bit worn deeply into a seat provided in the holding block for the cutting bit.

Another object of the invention is to provide a cutting bit and holding block assembly for attachment to a rotary wheel cutter in which the cutting bit orientation and distance of radial projection outward from the periphery of the wheel are predetermined and pre-set.

Various other objects and advantages of the present invention, and its most novel features, will become apparent to those skilled in the art by perusing the accompanying specifications, drawings and claims.

It is to be understood that although the invention disclosed herein is fully capable of achieving the objects and providing the advantages described, the characteristics of the invention described herein are merely illustrative of the preferred embodiment. Accordingly, I do not intend that the scope of my exclusive rights and privileges in the invention be limited to details of the embodiments described. I do intend that equivalents, adaptations and modifications of the invention reasonably inferable from the description contained herein be included within the scope of the invention as defined by the appended claims.

SUMMARY OF THE INVENTION

Briefly stated, the present invention comprehends an improved cutting bit and holding block assembly for use on rotary wheel, chain and rotary cutters, of the type having a plurality of cutting bits projecting outwards from the periphery of the wheel, chain or rotor, and used to cut tree stumps or other hard or refractory materials.

The novel cutting bit and holding block assembly according to the present invention includes a holding block which rotatably supports a cylindrical cutting bit. The holding block has in plan view the shape of a relatively thick plate of generally uniform thickness. The plate has a generally rectangular-outline rear mounting section with holes through its thickness dimension for mounting the block to a flat side of a disk-shaped rotary cutting wheel. Holding blocks for use at different circumferentially spaced apart locations around the periphery of the wheel have different mounting hole locations. This permits each holding block and cutting bit assembly to be mounted at a precisely pre-determined angular orientation with respect to a radius of the wheel, and with each bit projecting a pre-set radial distance outward from the periphery of the wheel.

Each holding block has a radially outwardly projecting, trapezoidally-shaped front leg section which extends radially outwards from the periphery of the wheel to which the block is fastened. A circularly symmetric cutting bit is rotatably supported within a bore which extends into the outer, shorter portion of the leg of the holding block. The bore is disposed qenerally perpendicularly to a radius of the wheel, chain or rotor, but is canted inwards with respect to the transverse lower horizontal face of the leg and with respect to a radius of the wheel, chain or rotor. Thus positioned, the radially outermost portion of a rotary bit held in the bore contacts a surface to be worked at a negative rake angle as the wheel rotates the bit into contact with the working surface. The negative top rake angle advantageously provides clearance for chips severed by the bit. However, the dihedral angle between the outer transverse wall surface of the circular cutting bit tip and its outer tapered side wall is sufficiently acute as to present an effectively sharp angle between the cutting edge of the tip and the surface being worked. Therefore, the cutting bit and holding block assembly according to the present invention advantageously provides both an acute cutting bit edge angle, and a negative rake angle between the bit support leg and the working surface. In the preferred embodiment, the circular outer transverse wall of the cutting bit is concave, further increasing the acuteness of the cutting angle. Rotatably supporting the cutting bit allows the bit to be rotated about its own axis as a result of impacting a work surface as it is cutting, making wear of the peripheral cutting edge more uniform and increasing the useful life of the bit.

BRIEF DESCRIPTION OF THE DRAWINGS

FIG. 1 is a diagrammatic elevation view of a prior art stump cutting machine as it is used to cut a stump.

FIG. 2 is an exploded fragmentary perspective view of the rotary wheel of a prior art stump cutting machine, showing the method of attachment of three different types of cutting teeth to the periphery of the wheel.

FIG. 3 is a side elevation view of a novel holding block and cutting bit according to the present invention which is intended for use as a replacement for a straight cutter tooth of the type shown in FIG. 2.

FIG. 4 is a front-end elevation view of the apparatus of FIG. 3.

FIG. 5 is a bottom plan view of the article of FIG. 3.

FIG. 6 is a bottom plan view of a left-hand version of the article of FIGS. 3 and 4.

FIG. 7 is a bottom plan view of a right-hand version of the article of FIGS. 3 and 4.

FIG. 8 is an exploded, partly sectional elevation view of a cutting bit forming part of the article of FIGS. 3 and 4.

FIG. 9 is a longitudinal sectional view of the cutting bit of FIG. 8, showing the cutting disk attached to the shank of the bit.

FIG. 10 is a longitudinal sectional view of an alternate embodiment of a cutting disk for use on the shank of the cutting bit shown in FIG. 8.

DETAILED DESCRIPTION OF THE INVENTION

To best understand the important advantages of the cutting bit and holding block assembly according to the present invention, a brief description of rotary wheel stump cutters, and prior art methods of attaching cutting bits to the periphery of the wheel of such cutters, may be helpful.

Referring to FIG. 1, a typical prior art rotary wheel stump cutter is shown in use. As shown in the Figure, the prior art rotary wheel stump cutter A includes a rotary wheel B. Wheel B is supported and rotated by components of the stump cutter A which are not shown in the Figure.

As shown in FIG. 1, a plurality of cutting bits or teeth C protrude radially outwards from the periphery D of wheel B. Typically, the cutting bits C are made of hardened steel, tipped with carbide brazed to the steel portion of the bit, and are located at regular circumferential intervals about the periphery D of wheel B.

In FIG. 1, cutting bits D attached to wheel B of stump cutter A are shown in the process of cutting away a stump E In the cutting process, the lower carbide tipped face F of each cutting bit C is shown to make an angle of no greater than 90 degrees with the outer face G of the bit. Thus when wheel B rotates clockwise as shown in the Figure, a positive rake angle is formed between the cutting face F and the stump E. This positive rake angle is desirable, since it provides an effective concentration of cutting force on the stump. However, a positive, or neutral angle between that portion of the lower face F of a cutting bit C which is not actually severing material from the stump and a surface to be cut is undesirable. This is because a neutral or positive angle between the inactive portion of lower face F of cutting bit C and a radius of the wheel B tends to jam severed material between the lower face and as-yet uncut portions of the stump. As will be explained below, the present invention overcomes that problem. First, however, a description of further details of prior art rotary wheel stump cutters will be given.

In using rotary wheel stump cutters, it has been found that cutting action is improved by using different shaped cutting bits at different circumferential positions or "stations" around the periphery of cutting wheel B. Cutting action is further optimized by varying the distance each cutting bit projects radially outwards from the periphery of the wheel. This may be best illustrated by referring to FIG. 2.

As shown in FIG. 2, a typical stump cutter A uses a vertically disposed, disc-shaped wheel B having pairs of elongated bar-shaped cutting bits or teeth C selected from shapes H, J and K, secured at regular circumferential intervals around the periphery D of the wheel. As shown in the Figure, bit H has a straight rear shank portion L and a front portion M which angles rightwards, or outwards from the right side N of wheel B. Thus, bits H are referred to as right hand teeth. Bits J, in which the rear shank portion L and front portion M or the bit are collinear, are referred to as straight bits. Bits K in which the outer front portion of each bit angles leftwards, or outwards from the left side P of wheel B, are referred to as left-hand bits.

A boss Q protrudes downwards from the lower face R of the front portion M of each prior-art cutting bit C. Boss Q is vertically aligned with the front tip of front portion M of bit C, and has a lower carbide tipped face F.

Prior art stump cutters of the type shown in FIGS. 1 and 2 usually employ a pair of bar-shaped cutting bits C at each circumferential location around the periphery of wheel B. The two bits C comprising a pair are selected from the group comprising a right-hand, straight and left-hand bits, and are secured with their shank portions L in parallel horizontal alignment on opposite, right and left sides N and P of wheel B. Bits C are secured to wheel B by means of a pair of substantially identically-shaped right and left hand disks S and T, respectively. Disks S and T each have a diametrically disposed channel or slot U cut into a flat face of the disk, of the proper size and shape to receive the shank portion L of a bit C. Disks S and T are mounted in horizontally aligned, opposed positions to the right and left sides N and P of wheel B by means of threaded bolts (not shown) passing through indexed pairs of holes V, W and X in disk T, wheel B, and disk S, respectively. Holes X in right hand disk, or holes V in left hand disk T, may be threaded to engage threads on the securing bolts.

In prior art rotary wheel stump cutters of the type shown in FIGS. 1 and 2, each of the two bits C must be selected from shapes H, J and K and installed as a pair at a given circumferential station on wheel B. Optimum operation of the stump cutter also requires that the location of each bit C must each be adjusted to project a predetermined distance from the periphery D of the wheel. This installation and adjustment procedure can be a time consuming process. In contrast, the novel holding block and rotatable cutting bit according to the present invention utilizes a holding block having different mounting hole locations for bits to be used at different circumferential stations. This permits each cutting bit to be attached to a cutting wheel in a precisely located position, without any adjustment operations being required, as will now be described.

Referring now to FIGS. 3 to 8, an improved holding block and cutting bit assembly for use on rotary wheel cutters for cutting stumps, as well as for other applications, is shown. The novel assembly 20 according to the present invention presents a negative rake angle to a surface being cut, while simultaneously presenting a positive cutting bit edge rake angle to the surface.

As may be seen best by referring to FIGS. 3 to 5, 8 and 9, the novel cutting bit and holding block assembly 20 according to the present invention includes a holding block 21 which rotatably supports a cylindrical cutting bit 22. As may be seen best by referring to FIGS. 3 to 5, holding block 21 is of generally uniform thickness. Preferably, holding block 21 is fabricated from a 9/16 inch thick block of 4130 AMS steel or similar strong, heat-treatable, impact resistant material.

As shown in FIG. 3, holding block 21 has a generally rectangular plan-view rear section 23. Rear section 23 has a generally flat and vertical rear wall surface 24, a generally flat and horizontal upper wall surface 25, perpendicular to the rear wall surface, and a generally flat and horizontal lower wall surface 26, parallel to the upper wall surface. Rear section 23 also has generally flat and vertical left and right wall surfaces 27 and 28, respectively. Upper and lower through-holes 29 and 30 which extend through the thickness dimension of rear section 23 of holding block 21 are provided for fastening the holding block to either the left or right side of a rotary wheel of the type (B) shown in FIGS. 2. Each mounting hole 29 and 30 may be of sufficient diameter to provide clearance for the shank of a headed bolt insertable through the hole, as holes V of left hand disk T in FIG. 2. Alternatively, mounting holes 29 and 30 of holding block 21 may be threaded a pair of holding blocks 21 intended for use at a particular circumferential mounting station on wheel B consists of one block having un-threaded bolt clearance holes, and one block having threaded holes. This arrangement permits a pair of holding blocks 21 to be fastened to opposite lateral sides of a rotary wheel using a single pair of threaded bolts.

FIG. 3 illustrates by dashed lines alternate, mounting holes 29A and 30A displaced slightly from mounting holes 29 and 30 on holding block 21. By positioning holes 29 and 30 in holding block 21 at various locations, each holding block may be adapted for use at particular circumferential locations on a rotary cutting wheel B. Thus, the angular orientation and radial projection of each cutting bit 22 supported by a holding block 21 may be precisely pre-determined without any requirement for adjustments, when a particular cutting bit and holding block assembly is installed at a particular location on the cutting wheel.

As may be seen best by referring to FIG. 3, holding block 21 has a forward projecting leg section 31 for rotatably supporting a cutting bit 22. Leg 31 may have a generally rectangular plan view shape having a lower horizontal wall surface 32 offset upwards from lower surface 26 of rear section 23. Preferably, however, the upper flat wall surface 33 of leg 31 makes a downward dihedral angle with respect to the horizontal upper wall surface 25 of rear mounting section 23 of holding block 21. Thus formed, leg section 31 has a generally trapezoidal shape, with an outer end portion 34, and a front wall 35 of shorter height than the height of the inner part of the leg section which joins rear mounting section 23.

As shown in FIG. 3, the inner part of the lower wall surface 32 of leg 31 which is joined to rear mounting section 23 of holding block 21 is perpendicular to rear surface 24 of the rear mounting section. However, the outermost portion 36 of the lower wall surface slants upwards at an angle $\alpha$ (alpha) of approximately 7 degrees with respect to the inner part of the lower wall surface. Also, front wall 35 of leg 31 slants rearwards from a vertical plane perpendicular to inner part 32 of the lower wall surface of leg 31.

Outer end portion 34 of leg 31 has a stepped diameter circularly symmetric bore 37 which extends perpendicularly inwards from the lower wall surface 36 of the outer end portion of the leg. Since lower wall surface 36 is canted upwards at an angle $\alpha$(Alpha), bore 37 is canted inwards at the same angle with respect to vertical rear wall surface 24 of holding block 21. Bore 37 rotatably supports a stepped diameter, circularly symmetric cutting bit 21, which may best be described by referring to FIGS. 8 and 9.

As shown in FIGS. 8 and 9, tungsten carbide cutting bit 22 is comprised of two parts, a stepped diameter circularly symmetric support body 38 and an annular disc-shaped tungsten carbide cutting tip 39.

Body 38 of cutting bit 22 is preferably made of 4130 AMS steel, and has a large diameter front cylindrical portion 40 with a transverse circular front face 41. A smaller diameter cylindrical pin 42 projects axially outwards from front face 41 of body 38. Pin 38 is adapted to be insertably received by a central coaxial hole 43 through the thickness dimension of cutting tip 39.

Cutting tip 39 is preferably fabricated from tungsten carbide, and has a flat, annular rear face 45. Disk 39 has a lateral side wall 46 which tapers outward to a larger diameter front face 47 from rear face 45 of the disk. Front face 47 is concave, thus forming at its intersection with lateral side wall 46 an annular-shaped cutting edge 48. Since the lateral side wall 46 of disk 39 tapers inwards to a rear face 45 having a smaller diameter than front face 47 of the disk, an angle $\beta$(Beta) of less than 90 degrees, i.e., an acute angle, is formed between the lateral side wall and the front face of the disk. Thus, annular-shaped cutting edge 48 formed at the intersection of side wall 46 and front face 47 has an acute angle. Since front face 47 of tungsten carbide cutting tip 39 is concave, it slopes inwards from the front transverse surface of the disc at an angle $\beta$(Beta). The concavity of front face 47 further reduces the size of cutting angle $\Delta$(Delta), i.e., between the inner and outer side walls of cutting edge 48. Thus, if the front face 47 of cutting tip 39 slopes upwards at angle $\gamma$(Gamma) from lower leg surface 36, cutting angle $\Delta$(Delta) of cutting edge 48 is $\beta-2$.

As shown in FIG. 9, cutting disk 39 is attached to body 38 of cutting bit 22 by inserting pin 42 of the body into hole 43 of the disk, and brazing the two parts together.

Referring again to FIG. 8, it may be seen that an inwardly tapered annular wall section 49 of body 38 joins front cylindrical portion 40 of the body to a reduced diameter, front cylindrical flange section 50. Rearward of front cylindrical flange section 50, body 38 of cutting bit 22 has a reduced diameter neck section 51 of uniform diameter. Body 38 also has a rear cylindrical flange section 52 rearward of the neck section, of the same diameter as front flange section 50.

The method of rotatably supporting cutting bit 22 within bore 37 of holding block 21 may best be understood by referring to FIGS. 3 and 4. As shown in those Figures, bore 37 has a countersunk lower entrance opening 53 adapted to receive and rotatably seat tapered annular wall section 49 of cutting bit 22. The upper end 54 of bore 37 is of uniform diameter, and may extend through the upper wall surface 33 of outer leg 31 of holding block 21.

Body 38 of cutting bit 22 is rotatably supported within bore 37 of holding block 21, preferably by means of a roll pin 55 which is press fitted into a hole 56 which extends transversely through front leg section 31 of holding block 21. Hole 56 for roll pin 55 extends perpendicularly though the inner cylindrical wall surface of uniform diameter upper portion 54 of bore 37. When body 38 of cutting bit 22 is inserted into bore 37 sufficiently far for the tapered annular wall section 49 of the body to seat on the tapered annular wall surface 57 of countersunk entrance opening 53, the rearmost portion of neck 51 of the body is longitudinally aligned with roll pin hole 56. In this position, roll pin 55 may be forcibly inserted into roll pin hole 56. Thus placed, abutting contact between roll pin 55 and rear shoulder 58 formed between neck 51 and rear flange 52 prevents longitudinal movement of body 38 out of bore 37, thereby retaining bit 22 rotatably within holding block 21. Since the length of neck 51 is greater than the diameter of roll pin 55, body 38 may move inwards into bore 37 as tapered annular wall 49 of the body wears down annular wall surface 57 of countersunk entrance opening 53. Longitudinal inward motion of body 38 in response to wear of annular wall surface 57 may continue until roll pin 55 abuts front shoulder 59 formed at the intersection of neck 51 and front flange 50 of the body.

As shown in FIG. 3, the lower transverse surface of cutting bit 22 makes a negative rake angle $\alpha$(Alpha), typically 7 degrees, with respect to a horizontal work surface El. However, since the angle $\beta$(Beta) between the lateral side wall 46 and lower face 47 of cutting disk 39 is acute typically 14 degrees, an effectively sharp cutting edge 48 is presented to the work surface El. Moreover, if the lower cutting face 47 of cutting bit 22 is concave, sloping upwards from the lower transverse face, at an angle $\gamma$(Delta), typically 14 degrees, the cutting bit angle $\Delta$(Delta) becomes more acute, equal to $\beta - 2$. If the angle $\gamma$(Gamma) between the lower transverse surface of the cutting bit and the concave surface intersecting cutting edge 48 is greater than the holding block rake angle $\alpha$(Alpha), a tangent vector from the inner surface of cutting edge will intersect the work surface El at a positive angle $\epsilon$(Epsilon), typically 7 degrees, in spite of the negative slope $\alpha$(Alpha) of the holding block. Thus, the novel cutting bit and holding block assembly according to the present invention provide both the advantage of having a negative tool rake angle, to allow free transit of material severed or abraded from a work surface, and the advantage of having a cutting bit which has an acute angle cutting edge which contacts a work surface, thereby effectively concentrating the severing/abrading force on the work surface.

As shown in FIGS. 6 and 7, the novel cutting bit and holding block assembly 20 according to the present invention may be constructed with a dihedral angle between rear mounting section 23 and front leg section 31 of the holding block 21. Thus, as shown in FIGS. 6 and 7, a left hand assembly 20B and right hand assembly 20C may be constructed for replacement of prior art cutting bits K and H, respectively, shown in FIG. 2.

FIG. 10 illustrates an alternate embodiment of cutting bit disk 39. In the alternate cutting bit disk 69, the carbide face of the disk is replaced by a plurality of diamond-coated disks 70.

What is claimed is:

1. An improved cutting bit and holding block assembly for rotary wheel cutters of the type having a plurality of cutting bits which project radially outwards from the periphery of a rotatable cutting wheel, said cutting bit and holding block assembly comprising:
    (a) a holding block having means for fastening said holding block to said wheel, said holding block having a circular cross-section bore, adapted to rotatably support a circularly symmetric body, and
    (b) a cutting bit having a circular transverse cross-sectional shaped body rotatably supported within said bore, said cutting bit having an outer transverse wall thereof defining a transversely disposed cutting tip, said tip having a circular cross section cutting edge, at least part of which said cutting edge protrudes outwards from said bore.

2. The cutting bit and holding block assembly of claim 1 wherein said outer transverse wall of said cutting tip is inclined, from a radius vector of said wheel joining the radially innermost part of said face, at an angle $\alpha$ in a circumferential direction opposite to the intended rotation direction of said for cutting.

3. The cutting bit and holding block assembly of claim 2 wherein said cutting tip has a circularly symmetric outer side wall which makes an acute angle $\beta$ with the outer transverse face of said cutting tip at the intersection between said side wall and said outer transverse face forming said cutting edge.

4. The cutting bit and holding block assembly of claim 2 wherein said outer transverse face of said cutting tip is concave, sloping upwards from a plane transverse to the cylindrical axis of said cutting tip and tangent to said cutting edge, at an angle $\gamma$, thereby giving an annular shape to said cutting edge.

5. The cutting bit and holding block assembly of claim 4 wherein said angle $\gamma$ is larger than said angle$\alpha$, whereby a vector tangent to said inner concave surface is inclined forward at a positive angle $\epsilon$ from a radius vector from said wheel joining said cutting edge.

6. The cutting bit and holding block assembly of claim 4 wherein said cutting tip has a circularly symmetric outer side wall which tapers at its intersection with said cutting edge of said cutting tip to form an acute angle $\beta$ with a plane transverse to the cylindrical axis of said cutting bit and tangent to said cutting edge.

7. The cutting bit and holding block assembly of claim 1 wherein said means for rotatably supporting said bit within said bore in said holding block comprises in combination an annular groove in the outer side wall of said bit, said groove having ar the opposite longitudinal ends thereof, first and second annular shoulders, and a cylindrical pin fastened to said holding block and transversely disposed between said first and second annular shoulders, thereby captivating said bit longitudinally within said bore between said flanges, while allowing free axial rotation of said bit.

8. The cutting bit and holding block assembly of claim 7 wherein said cutting bit has a radially inwardly tapered outer wall section between said cutting tip and said annular groove, and said bore in said holding block has a complimentarily tapered seat for rotatably supporting said tapered annular wall section.

9. The cutting bit and holding block assembly of claim 1 wherein said holding block is of generally uniform thickness.

10. The cutting bit and holding block assembly of claim 9 wherein said holding block has an outwardly projecting leg section, the lower surface of which projects radially outward from said wheel when said holding block is fastened to the flat side of said rotary cutting wheel.

11. The cutting bit and holding block assembly of claim 10 wherein a radially outward part of said lower surface of said leg section is inclined away from a contacting radius vector of said wheel, in a direction opposite the intended rotation direction of said cutting wheel.

12. The cutting bit and holding block assembly of claim 11 wherein said bore for said bit is perpendicular to said outer, inclined lower surface of said outer leg section and has an entrance opening through said surface.

13. A cutting bit and holding block assembly for rotary wheel cutters of the type having a plurality of cutting bits which project radially outwards from the periphery of a circular cutting wheel having flat sides and rotatable about a central axis perpendicular to said sides, said cutting bit and holding block assembly comprising;

(a) a holding block of generally uniform thickness having generally flat and parallel upper and lower surfaces, said holding block having a rear section including means for mounting said block to a side of said wheel with said lower flat surface of said block in flush contact with said side of said wheel, said holding block having a forward leg section which projects radially outwards from the periphery of said wheel when so mounted, said leg section having parallel to its front and rear faces a bore adapted to rotatably support a circularly symmetric body, and
  (b) a cutting bit having a circular body said body having circular transverse cross sectional shape said body rotatably supported within said bore, said cutting bit having at one transverse end thereof a transversely disposed cutting tip, said cutting tip having a circular cross section cutting edge, at least a part or which cutting edge projects below the lower surface of said leg and radially outwards therefrom.

14. The cutting bit and holding block assembly of claim 13 wherein a radially outer part of said lower surface of said leg section slopes away from a radius vector of said wheel joining the lower surface of the inner part of said leg section at an angle $\alpha$ in a direction opposite the intended rotational direction of said cutting wheel.

15. The cutting bit and holding block assembly of claim 14 wherein said bore is canted backwards at an angle from a line perpendicular to a radius vector of said wheel terminating at the lower entrance opening of said bore.

16. The cutting bit and holding block assembly of claim 15 wherein said bore extends perpendicularly inwards from said outer inclined lower surface of said leg.

17. The cutting bit and holding block assembly of claim 16 wherein said cutting tip has an outer transverse surface which intersects with an axially disposed outer wall surface to form a circular cutting edge.

18. The cutting bit and holding block assembly of claim 17 wherein said outer wall surface tapers radially inwards and rearwards of said outer transverse face of said cutting tip, thereby making an acute angle $\beta$ with said lower transverse face to form a cutting edge having an acute dihedral angle.

19. The cutting bit and holding block assembly of claim 17 wherein said outer transverse face of said cutting tip is concave, sloping upwards from a plane transverse to the cylindrical axis of said cutting tip and tangent to said cutting edge, at an angle 65 .

20. The cutting bit and holding block assembly of claim 19 wherein said angle $\gamma$ is larger than said angle $\alpha$, whereby a vector tangent to said inner concave surface and directed toward a work surface advanced an angle $\alpha$ from the outer lower surface of said leg section is inclined forward a positive rake angle $\epsilon$ with respect to aid work surface.

21. The cutting bit and holding block assembly of claim 18 wherein said outer transverse face of said cutting tip is concave, sloping upwards from a plane transverse to the cylindrical axis of said cutting tip and tangent to said cutting edge, at an angle Gamma.

22. The cutting bit and holding block assembly of claim 21 wherein said angle $\gamma$ is larger than said angle $\alpha$, whereby a vector tangent to said inner concave surface and directed toward a work surface advanced an angle $\alpha$ from the outer lower surface of said leg section is inclined forward a positive rake angle $\gamma$ with respect to aid work surface.

* * * * *